(12) United States Patent
Vieider et al.

(10) Patent No.: US 6,516,448 B1
(45) Date of Patent: Feb. 4, 2003

(54) FIBER ALIGNING STRUCTURE

(75) Inventors: Christian Vieider, Sollentuna (SE); Johan Holm, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/506,743

(22) Filed: Feb. 18, 2000

(30) Foreign Application Priority Data

Feb. 19, 1999 (SE) .............................................. 9900577

(51) Int. Cl.[7] .............................................. G06F 17/50
(52) U.S. Cl. ................................ 716/2; 716/21; 716/19
(58) Field of Search ........................... 716/1, 2, 21, 15, 716/19, 20; 385/49, 50, 51, 52, 65, 83; 438/42, 44, 81, 421, 424, 429, 221, 462, 700

(56) References Cited

U.S. PATENT DOCUMENTS

| 4,762,387 A | | 8/1988 | Batdorf et al. ................. 385/71 |
| 4,772,086 A | | 9/1988 | Bellerby et al. ............... 385/89 |
| 4,973,126 A | * | 11/1990 | Degani et al. ................. 385/55 |
| 5,073,003 A | * | 12/1991 | Clark .......................... 372/36 |
| 5,471,552 A | * | 11/1995 | Wuu et al. .................... 216/24 |
| 5,557,695 A | * | 9/1996 | Yamae et al. ................ 385/147 |
| 5,727,104 A | * | 3/1998 | Sasaki et al. .................. 385/92 |
| 5,881,190 A | * | 3/1999 | Harpin et al. ................ 385/130 |
| 5,978,531 A | * | 11/1999 | Funabashi ..................... 385/31 |
| 6,181,854 B1 | * | 1/2001 | Kojima et al. ................. 385/49 |
| 6,263,137 B1 | * | 7/2001 | Yoneyama et al. ........... 385/49 |
| 6,296,789 B1 | * | 10/2001 | Go et al. .................... 264/1.25 |

FOREIGN PATENT DOCUMENTS

DE 19647685 C1 3/1998

OTHER PUBLICATIONS

International Search Report Date of Completion: Nov. 3, 1999; Date of Mailing: Nov. 10, 1999.

* cited by examiner

Primary Examiner—Matthew Smith
Assistant Examiner—Paul Dinh
(74) Attorney, Agent, or Firm—Burns, Doane, Swecker & Mathis, L.L.P.

(57) ABSTRACT

The present invention relates to a device for passively aligning at least one substrate-carried optical fiber with at least one optical device. The substrate is patterned with a buried etching stop layer. The substrate is then etched to provide a pattern of U-grooves whose depths correspond to the thickness of material that overlies the etching stop layer and whose positions on the substrate are aligned relative to the optical device. The optic fiber is disposed and fixed in the U-groove. The invention also relates to a device produced by means of said method.

2 Claims, 2 Drawing Sheets

FIBER ALIGNING STRUCTURE

This application claims priority under 35 U.S.C. §§119 and/or 365 to 9900577-9 filed in Sweden on Feb. 19, 1999; the entire content of which is hereby incorporated by reference.

FIELD OF INVENTION

The present invention relates to a method of passively aligning at least one substrate-carried optical fibre with at least one optical device, and to a device which includes at least one optical fibre disposed on a substrate and aligned with at least one optical device.

DESCRIPTION OF THE BACKGROUND ART

Optocoponents are expensive to produce. A considerable part of this expense is entailed by the fact that optocomponents are equipped with an optical connection that has high tolerance requirements. It is necessary to position the fibre with great precision; with respect to an optical chip a precision of about 1/1000 mm.

This is normally effected by so-called active alignment, wherein an electric current is applied to an optical chip so as to cause said chip to generate light which, in turn, is launched into an optical fibre. The launching maximum can be determined, by moving the fibre in extremely small increments whilst measuring the light launched into the fibre at the same time. The fibre is then fixed in this maximum position. The method is complicated, laborious and extremely demanding with respect to the fine-mechanical component parts.

In an endeavour to reduce costs, an alternative alignment method, so-called passive alignment, is being used to a progressively increasing extent. One distinguishing feature of this method is that the optochip is not energised during the alignment process, but is, instead, fastened together with the optofibre on a common carrier in predetermined and well-defined positions. The carrier is normally comprised of silicon and provided with micromechanical structures for facilitating positioning of the optochip and optofibre.

Patent Application JP 09281360 teaches a structure that includes a plurality of optical fibres disposed in V-grooves. where the fibres are aligned relative to a light-emitting source.

One problem associated with this solution is that the crystal orientation of the silicon disc must be accurately determined, in order to achieve the desired groove geometry.

SUMMARY OF THE INVENTION

The object of the present invention is to at least reduce the aforesaid problems.

One advantage afforded by the present invention is that the silicon disc can be patterned regardless of crystal orientation.

Another advantage afforded by the invention is that the U-grooves can be made late in the process, owing to the fact that no aggressive wet chemicals are used. This enhances the degree of freedom in the process sequence, the compatibility between process steps, and also increases the yield. Yet another advantage afforded by the invention is that the U-grooves can be etched to a high degree of precision with respect to groove width and length, and that the walls of the U-grooves are vertical in relation to a substrate surface.

Yet another advantage afforded by the invention is that the grooves can be produced with essentially vertical walls and a groove bottom surface which is essentially parallel with said substrate surface, regardless of the geometry of the groove in a plane parallel with said substrate surface.

The invention will now be described in more detail with reference to preferred embodiments thereof and also with reference to the accompanying drawings.

DETAILED DESCRIPTION OF PREFERRED EMBODIMENTS

Figure 1:
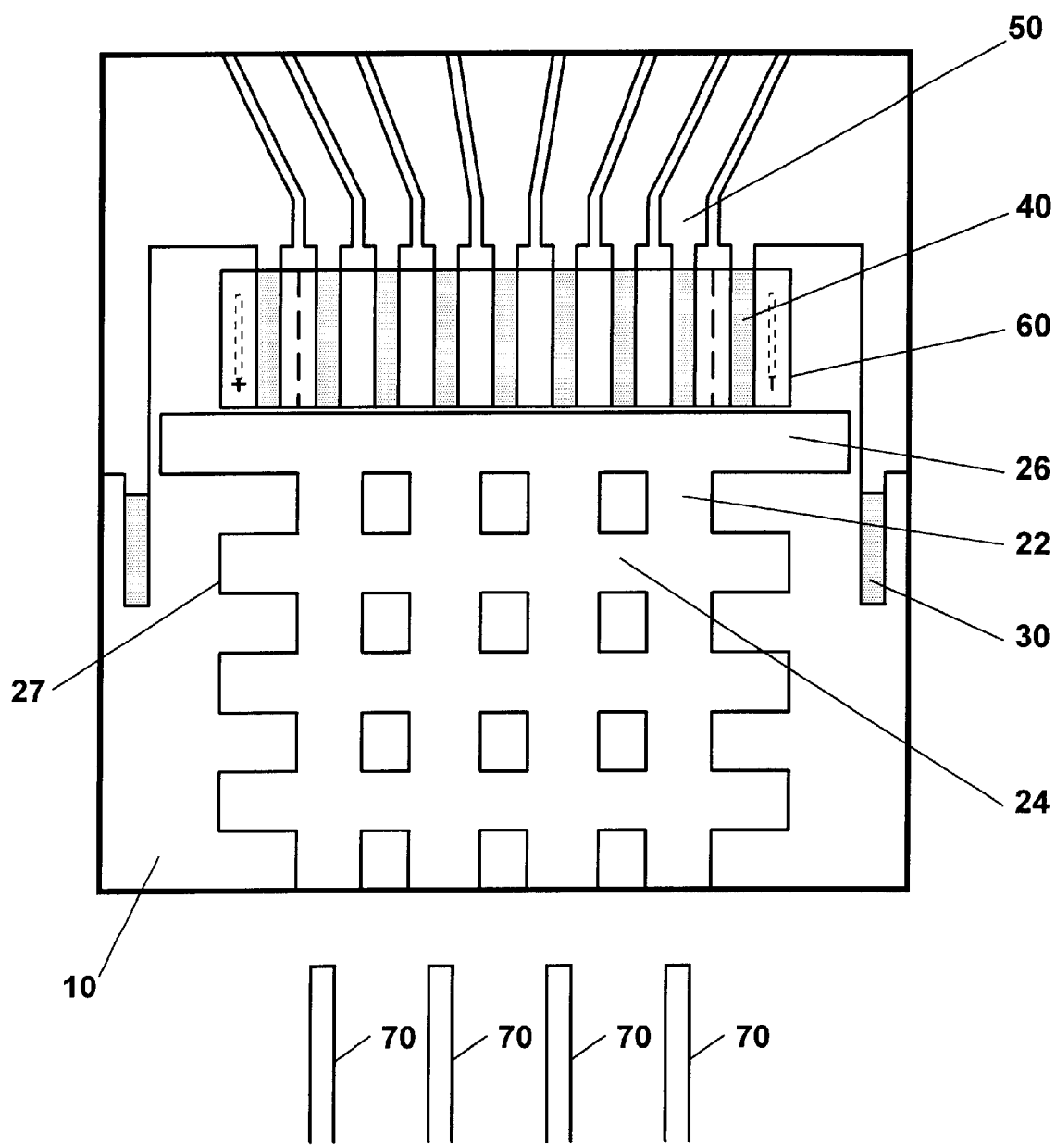
FIG. 1 of the accompanying drawing illustrates one embodiment of an inventive device from above.
Figure 2A:
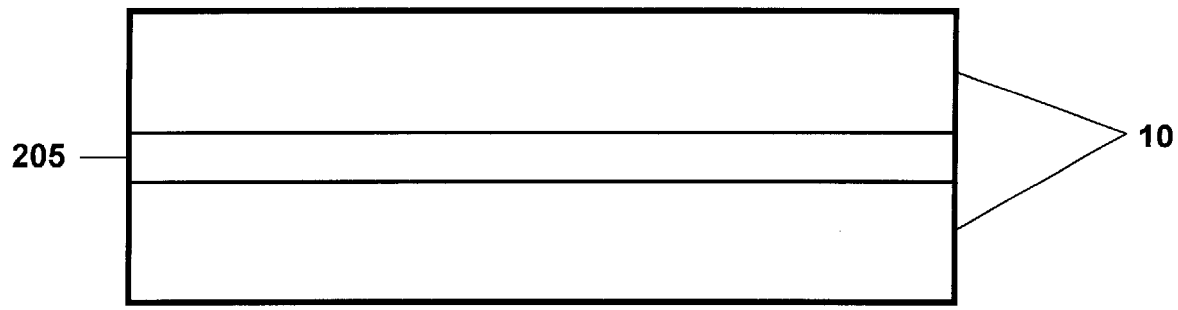
FIG. 2A illustrates an etching stop layer buried in a silicon substrate.

FIG. 1 illustrates an embodiment of an inventive device which includes a substrate 10, a laser array 60, etched U-grooves 22, 24 and 26, vertical end surfaces 27, a solder indicator 30, electrodes 50 and solder connections 40. In the illustrated case, the substrate is a silicon substrate and may be parallel with any crystallographic direction whatsoever, with the flat surface of the substrate facing upwards. In addition, the substrate 10 can be a silicon on insulator (SOI) wafer. Buried in the silicon substrate is an etching stop layer. FIG. 2A illustrates an etching stop layer 205 buried in silicon substrate 10. In the illustrated case, the etching stop layer is comprised of a layer of silicon dioxide, SiO2. The thickness of pure silicon above the etching stop layer will depend on the desired depth of the U-grooves etched in the substrate.

Figure 2B:
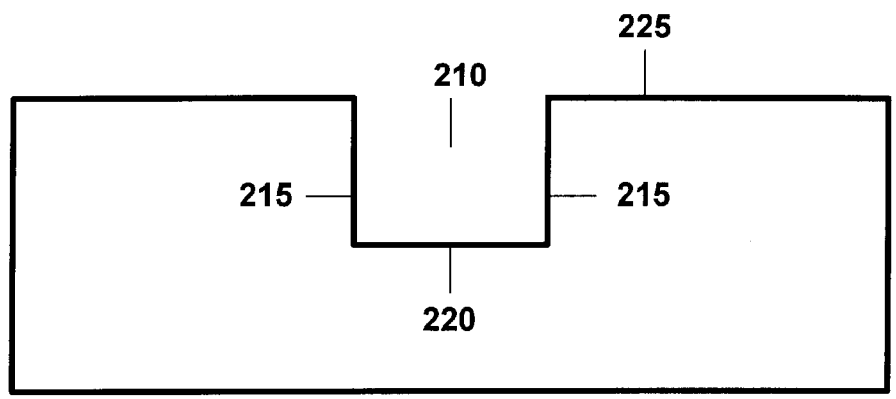
FIG. 2B illustrates an exemplary U-groove.

In the illustrated embodiment, four mutually parallel U-grooves 22 have been etched in the substrate and aligned relative to the laser array 60. FIG. 2B illustrates an exemplary U-groove 210. As illustrated in FIG. 2B, a U-groove 210 can include vertical walls 215 and bottom surface 220. It should be noted that bottom surface 220 is essentially parallel with the top surface 225 of the substrate 10. Optical fibres 70 are applied in said grooves. The fibres can be aligned passively in the U-grooves, owing to the fact that said fibres are aligned relative to the position of the laser array and to the fact that the breadth and depth of the U-grooves are adapted exactly to the fibre dimensions. Three transverse trenches 24 have been etched orthogonally to said U-grooves. These trenches 24 function to distribute glue between the U-grooves 22 when fixing the optical fibre therein. A further trench 26 is etched orthogonally in relation to the fibre-receiving U-grooves 22 at the end of said grooves. This further trench functions as a receptacle for surplus glue. It is highly undesirable for glue to fasten to the optical contact surface of the fibre or on the laser facet. The capillary forces acting on the glue between the fibre and respective surfaces of a U-groove in which a fibre has been placed may be of such magnitude as to enable glue to travel right up to the end of the optical fibre. The presence of a transverse glue restraining trench 26 at the end of the U-grooves 22 receiving said optical fibres reduces or eliminates the capillary forces in the critical region at the end of the fibre, therewith reducing the danger of glue contaminating the optical contact surface of the fibre.

The U-grooves are etched by means of a dry etching method. The method used in the present case was a deep reactive ion etching process (DRIE), preferably anisotropic silicon etching process (ASE) from Surface Technology Systems (STS).

The solder indicator 30 functions to judge solder quality and shows more effectively when the solder melts in conjunction with aligning the laser array on the substrate via solder connections 40, The electrodes 50 arranged on the substrate are used to supply the lasers in said array 60 with current.

Because the optical fibre receiving U-grooves 22, the transverse trenches 24 and the glue receptacle 26 are dry-etched, the etching process can be carried out whenever, preferably as late as possible and, for instance, after solder plating, so that marked topographical variations on the substrate surface will materialise late in the process and therewith present the least possible trouble in the remaining process steps. The buried silicon dioxide layer defines the depth of the etched U-grooves to a degree of accuracy that can be greater than $1/1000$ mm across the whole of the wafer. The U-grooves will hake the same depth as the uppermost silicon layer across the whole of the wafer, with a variation corresponding to the variation in thickness of said layer.

Because the walls of the U-grooves are vertical relative to the substrate surface, as distinct from etched V-grooves whose surfaces are inclined relative to said substrate surface, the fibre can be moved up against a well-defined stop, thereby enabling the fibre to be coupled more effectively to a laser, for instance.

It will be understood that the invention is not restricted to the aforedescribed and illustrated exemplifying embodiments thereof, and that modifications can be made within the scope of the following claims.

What is claimed is:

1. A method passively aligning at least one substrate carried optical fibre with at least one optical device, comprising the steps of:

patterning a substrate that includes a buried etching stop layer;

etching the substrate to produce a pattern of U-grooves with vertical walls and vertical end surfaces, the pattern of U-grooves including a first U-groove and at least two second U-grooves, the at least two second U-grooves being formed along a length of, and orthogonal to, the first U-groove, the depth of the U-grooves corresponds to the thickness of material that overlies said etching stop layer and whose position on the substrate is aligned relative to said optical device;

etching an orthogonal U-groove at the end of said first U-groove, to provide a glue receptacle, the orthogonal U-groove at the end of the first U-groove being substantially parallel with the at least two second U-grooves; and disposing the optical fibre in the first U-groove and fixing said fibre in said first U-groove.

2. A device which includes at least one optical fibre disposed on a substrate and aligned with at least one optical device, wherein the optical fibre is disposed and fixed in a first U-groove whose walls and end surfaces are essentially vertical in relation to a substrate surface and whose bottom surface is essentially parallel with a nonetched substrate surface, wherein at least two second U-grooves are arranged along the length of, and orthogonal to, the first U-groove, wherein an orthogonal U-groove is provided at the end of the first U-groove and forms a glue receptacle, the U-groove provided at the end of the first U-groove being substantially parallel to the at least two second U-grooves.

* * * * *